UNITED STATES PATENT OFFICE.

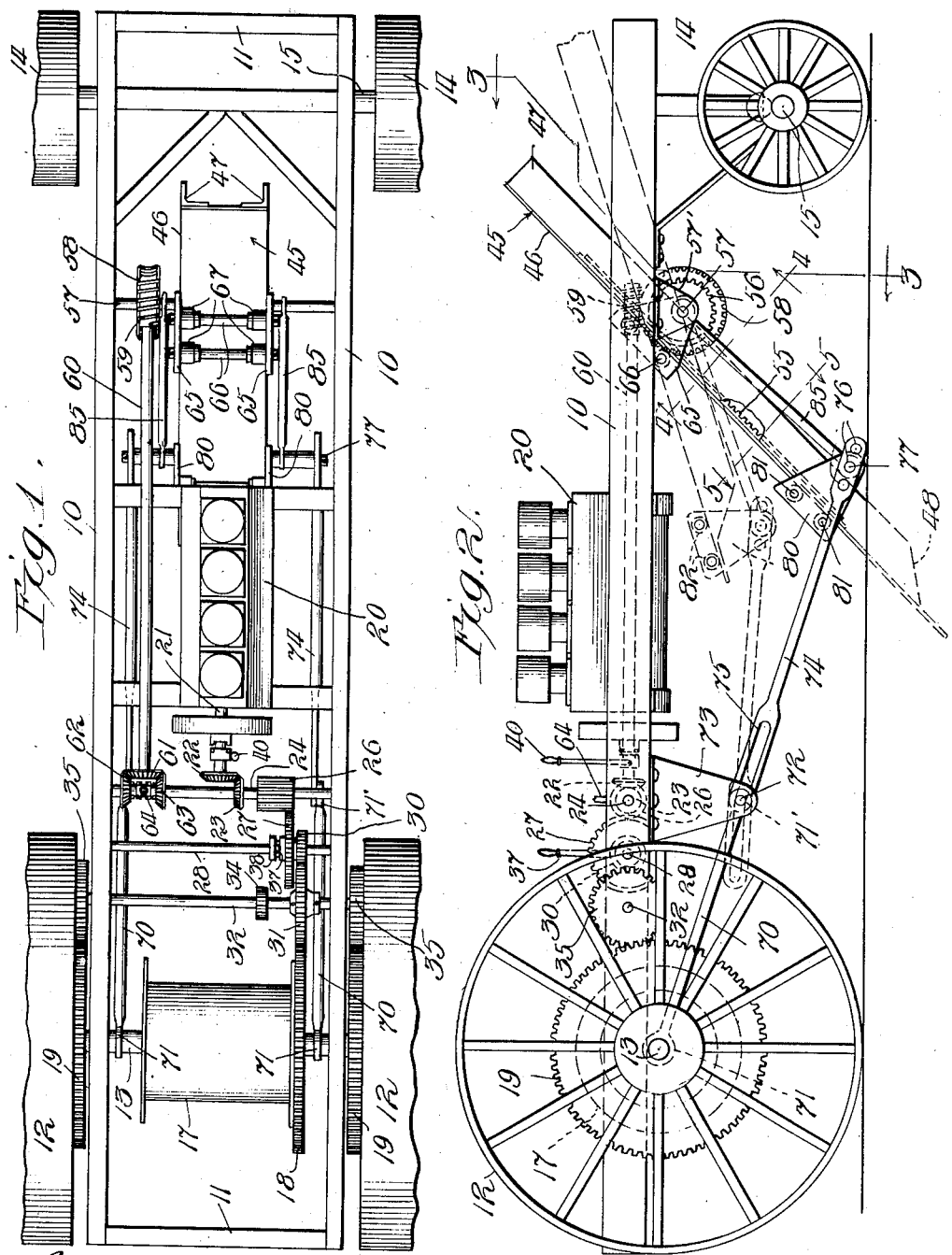

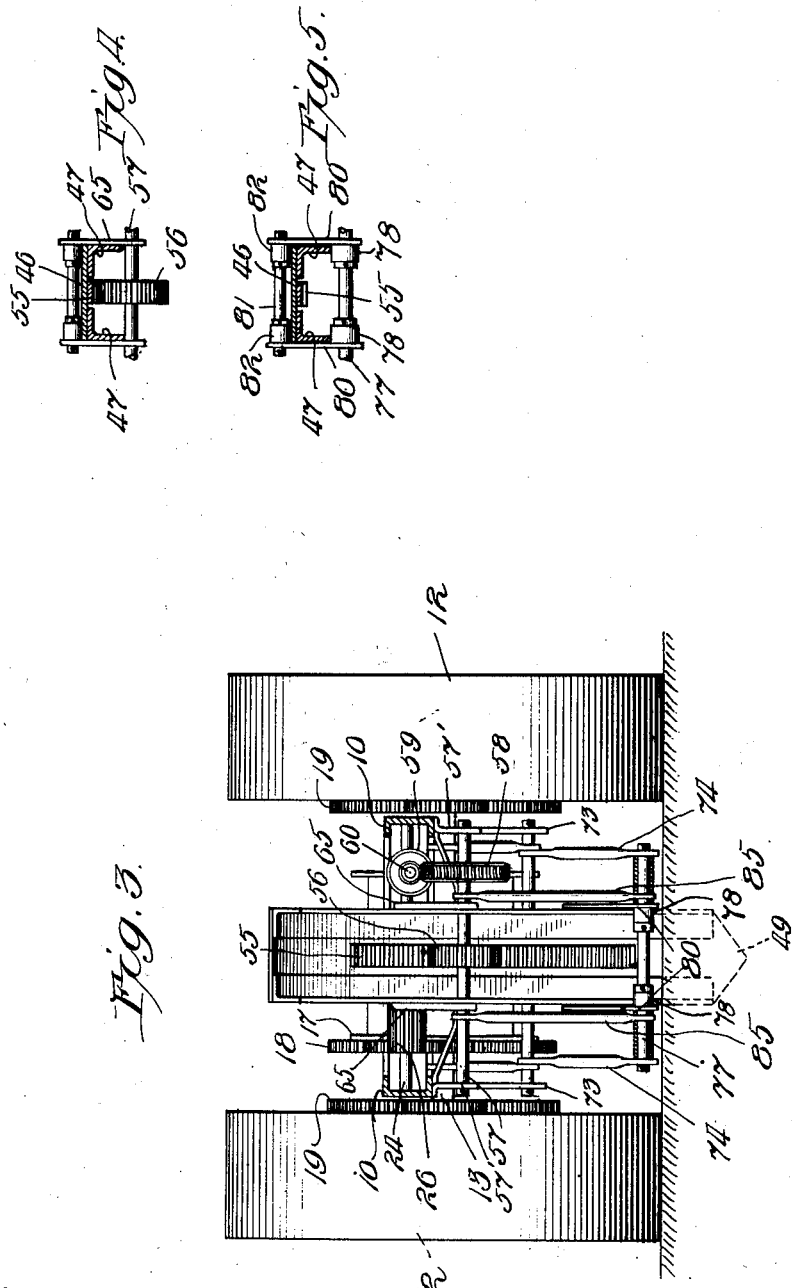

CHARLES H. CLARK, OF WATERTOWN, WISCONSIN.

CAPSTAN.

1,113,543.  Specification of Letters Patent.  Patented Oct. 13, 1914.

Application filed September 21, 1912. Serial No. 721,555.

*To all whom it may concern:*

Be it known that I, CHARLES H. CLARK, a citizen of the United States, and a resident of Watertown, in the county of Jefferson and State of Wisconsin, have invented certain new and useful Improvements in Capstans; and I do hereby declare that the following is a full, clear, and exact description thereof, reference being had to the accompanying drawings, and to the characters of reference marked thereon, which form a part of this specification.

This invention relates to improvements in capstans for pulling heavy loads, and refers more specifically to improved anchoring means for such capstans and to means for manipulating the anchor to insert it into and withdraw it from the ground.

The invention relates further to an improved combined power capstan and tractor, arranged so that the motor which drives the tractor also operates, when the tractor is stationary, to insert the anchor into and remove it from the ground.

The invention consists in the novel arrangement and combination of the elements hereinafter set forth, and more particularly pointed out in the appended claims.

In the drawings:—

Figure 1 is a plan view of a power capstan embodying my invention. Fig. 2 is a side elevation thereof. Fig. 3 is a vertical section on the line 3—3 of Fig. 2. Fig. 4 is a detail section on the line 4—4 of Fig. 2. Fig. 5 is a detail section on the line 5—5 of Fig. 2.

The frame of the machine comprises side members 10, 10 and end members 11, 11, which may be made of channel cross section, as herein shown.

12, 12 designate traction wheels which are rotatively mounted on a driving axle or shaft 13 which is carried in bearings on the side members of the frame.

14, 14 designate steering wheels rotatively mounted on a steering axle 15, which may be connected at the front end of the frame in any suitable manner, and provided with any suitable steering device, not shown.

17 designates a drum that is rotatively mounted on the axle 13, between the end flanges of which drum a cable is adapted to be wound, which cable is adapted to be connected to the machine to be drawn forwardly. Said drum may be provided at one end with a large gear wheel 18.

19, 19 designate large gear wheels which are fixed to the traction wheels 12, 12.

20 designates a motor supported on the frame in front of the drum 17, herein shown as an internal combustion engine. The crank shaft 21 of said engine is geared by the gear wheels 22, 23 to a transverse transmission shaft 24 rotatively mounted in suitable bearings carried by the side members of the frame. Said shaft 24 carries a wide faced pinion 26 which is adapted to mesh with a gear wheel 27 that is mounted on a transverse shaft 28, said gear wheel being slidably mounted on said latter shaft, but non-rotative thereon. Fixed to or made integral with the gear wheel 27, and therefore sliding and turning therewith, is a pinion 30. The said pinion 30 is adapted to mesh with a pinion 31 that is loosely mounted on a shaft 32, said pinion 31 meshing also with the gear wheel 18 of the drum. The gear wheel 27 of the shaft 28 is adapted to mesh with a pinion 34 that is fixed to the shaft 32, and said shaft 32 carries pinions 35, 35 which mesh with the large gear wheels 19 of the traction wheels. The said gear wheel 27 and pinion 30 are adapted to be slid endwise on the shaft 28, as by means of a shifter lever 37, suitably engaged to a collar 38, movable with said gear wheel and pinion. When the gear wheel and pinion occupy one limit of their movement the gear wheel 27 meshes with the pinion 34 to drive the rear traction wheels, the pinion 30 being at this time out of mesh with the pinion 31. When the parts are shifted to the other limit of their movement driving power to the traction wheels is disconnected and the pinion 30 is brought into mesh with the pinion 31 to connect the motor to the drum. In an intermediate or neutral position of the gear wheel 27 and pinion 30, both the traction wheels and the drum are disconnected from the motor. The gearing will, of course, be designed to give appropriate speed to the tractive wheels and capacity to rotate in reverse direction, as is common. Power is adapted to be cut off from the transmission shaft by means of a suitable clutch device operated by a hand lever 40. The gearing referred to constitutes, in itself, no part of the present invention, and it has not been deemed necessary to more fully illustrate or describe the same.

The capstan herein shown is designed to pull heavy loads, such for instance, as excavating machinery, tile laying machinery and the like, one instance of its use being a tile laying machine such as is illustrated in my co-pending application for United States Letters Patent, Serial No. 721,556, filed of even date herewith. In such use of the capstan it becomes necessary to provide anchoring means of great strength for anchoring the capstan to the ground, and it becomes also desirable to provide means for readily inserting the anchor into and removing the same from the ground. I may employ one or more than one of such anchors. In the present instance, I have, for the sake of simplicity of illustration, shown but a single anchor and appropriate mechanism for operating the same.

As herein shown, 45 designates the single anchor referred to which is arranged forwardly of the motor 20. The anchor herein shown comprises a flat steel plate 46 which is reinforced at its edges by angle bars 47, 47, said angle bars terminating short of the lower rear end of the anchor and being beveled at 48 to facilitate the insertion thereof into the ground. The central web or plate 46 of the anchor is also beveled or pointed at its lower forward end, as indicated at 49, to facilitate its insertion into the ground. The said anchor is arranged in the capstan frame at a downward and rearward angle of approximately 45 degrees. Any suitable mechanical means may be employed to insert or force the anchor into the ground and to withdraw it therefrom, a rack and pinion mechanism being herein shown.

In the form of construction illustrated a series of rack teeth 55 is applied to the forward or lower side of the anchor, herein shown as having the form of a rack bar separately made and applied to the central web or plate of the anchor. The said rack bar is engaged by a gear wheel or pinion 56 that is fixed to a shaft 57 which extends transversely across, and is rotatively mounted in bearings 57' carried by the side members of the frame. The said shaft 57 is driven from the transmission shaft 24 through the medium of a worm wheel 58 on the shaft 57, and a worm 59 on the shaft 60 which extends rearwardly from the worm toward the transmission shaft, and is provided at its rear end with a beveled gear 61 arranged for meshing engagement with opposing gear wheels 62, 63 loosely mounted on said transmission shaft and adapted to be separately locked to said shaft, as by a clutch collar or spool slidable but non-rotative on the shaft, and said collar or spool may be actuated by a hand lever 64. Through the mechanism described, the shaft 60 may be rotated in either of two opposite directions to drive the pinion 56 in either direction to insert the anchor into or withdraw it from the ground. The rack of the anchor is maintained in meshing engagement with the pinion 56 by means of a guide frame comprising the side plates 65 which are apertured at their forward portions to receive the shaft 57 which carries the gear 56, and are apertured at their rear upper margins to receive shafts 66, 66 on which are mounted anti-friction rollers 67, 67 which bear against the upper rear face of the anchor.

In order to avoid the anchor resisting stress being transmitted to the capstan frame, when the anchor is set into the ground and a pulling force is exerted on the capstan, I may provide a connection between the anchor and the axle which carries the capstan drum of such construction and arrangement as to transmit tension stresses directly from the drum axle or shaft to the anchor at a point near where it enters the ground. Thus I am enabled to relieve the frame of the machine from the anchor resisting stresses, and am thereby enabled to correspondingly reduce the dimensions of the frame, as compared to machines wherein the anchor resisting stresses are transmitted through the frame at a point distant from the drum. A practical form of connection between the drum axle or shaft and the anchor is herein shown and is made as follows:

70, 70 designate links provided at their forward ends with eyes 71, 71 which engage over the drum axle or shaft 13 and are provided at their rear ends with eyes 71' that engage over a transverse shaft 72 mounted in bearings 73 which depend from and are attached to the side members of the frame.

74, 74 designate links which are slotted at their rear ends 75 to engage over the shaft 72 and are provided at their front ends with apertures or eyes 76 to receive a shaft 77 arranged in front of the inclined anchor near the ground level, said shaft 77 carrying rollers 78, 78 which bear against the front free margins of the angle bars 47 of the anchor, as more clearly shown in Figs. 3 and 5.

80, 80 designate triangular plates, arranged one at each lateral side of the anchor, and the apices of which are apertured to receive the shaft 77. The rear upper sides of said plates 80 are apertured to receive other, vertically separated shafts 81 which extend transversely across the rear or plain face of the anchor and are provided with bearing rollers 82 which bear upon said rear plain face of the anchor. The said plates 80, with the shafts and rollers carried thereby, constitute a lower guide for the anchor (supported from the main frame of the machine, as hereinafter described) to maintain the lower guide in proper relation to the upper guide formed between the roller bearing frame 65 and the pinion 56, so as to thereby enable the anchor to be guided properly into the ground and held in proper angular position relatively to the frame.

The angle at which the anchor enters the ground may be varied by providing the rear ends of the links 74 with a number of apertures 76 to receive the shaft 77, as will be apparent. When operating in moist or loose ground the angle of the anchor to the vertical may be somewhat decreased, as compared to operations in more solid or dry ground, and the construction and arrangement described, permit adjustment of the anchor to suit different conditions met with.

In manipulating the clutch lever 64, the shaft 60 may be connected to the motor 20 to either drive the anchor into the ground or withdraw it therefrom at a time when power is cut off from the traction wheels and the drum. When the anchor is withdrawn from the ground, the overweight of the upper end thereof acts to swing the lower end of the anchor upwardly about the shaft 57 as a fulcrum to the position indicated in dotted lines in Fig. 2. The slotted connection of the links 74 with the shaft 72 permits this relative movement of the lower end of the anchor relatively to the shaft.

The guide frame composed of the side plates 80, the shafts 77 and 81 and their rollers is supported, when the anchor is thus withdrawn and swung upwardly, by means of the frame bars or links 85, 85 connected at their lower ends to the shaft 77 and at their upper ends to the shaft 57, said frame bars or links serving to maintain the lower guide frame in proper alinement relatively to the anchor and to prevent a canting movement of the lower guide frame such as would tend to cause the anchor to bind in said frame.

When operating in moist or loose ground, the anchor may be withdrawn from the ground by merely driving the machine forwardly under its own power, or otherwise from an anchored position. In such event, the slotted connection of the links 74 with the shaft 72 permits the lower end of the anchor to swing upwardly toward the shaft 72 without imposing any thrust stresses on said connections which would, in the absence of such lost motion, tend to distort said connections.

While I have described the structural details of the machine shown, constituting one embodiment of my invention, with considerable particularity, it will be understood that many of the details are capable of variation within the spirit and scope of the invention, and the invention is not limited to such details except as hereinafter made the subject of specific claims, and as imposed by the prior art.

I claim as my invention,—

1. The combination with a motor driven capstan embracing a frame and a motor thereon operatively connected to the capstan, of a downwardly and rearwardly inclined anchor therefor, guides on the frame to guide the endwise movement of the anchor and operative connections between the motor and anchor to mechanically force the same into and withdraw it from the ground.

2. The combination with a motor driven capstan, of a downwardly and rearwardly inclined anchor therefor, guides carried by the frame for the upper and lower ends of the anchor, and operative connections between the motor and anchor, embracing a reversing gear mechanism, whereby the anchor may be forced into or withdrawn from the ground by said motor.

3. The combination with a motor driven capstan, embracing a frame and a motor thereon operatively connected to the capstan, of a downwardly and rearwardly inclined anchor therefor, guides carried by the frame for the upper and lower ends of the anchor, and rack and pinion mechanism operated by the motor for forcing the anchor into and withdrawing it from the ground.

4. The combination with a motor driven capstan, embracing a wheeled frame and a motor thereon operatively connected to the capstan, of an anchor therefor insertible into and withdrawable from the ground, a rack arranged longitudinally of the anchor, a rotative pinion mounted on the frame and meshing with said rack, and means whereby said pinion is driven from said motor, said anchor being swingable about the axis of said pinion as a fulcrum, whereby when the anchor is withdrawn from the ground the overweight of the upper end thereof swings the lower end of the anchor away from the ground.

5. The combination with a capstan, embracing a rigid frame, of an inclined anchor therefor insertible into and withdrawable from the ground, guide means for the upper end of the anchor carried by said frame, other guide means below and suspended from the frame for the lower end of the anchor, and operating means carried by the frame and co-acting with the anchor to positively withdraw the anchor from and insert it into the ground.

6. The combination with a capstan, embracing a rigid frame, of an anchor therefor insertible into and withdrawable from the ground, guide means for the anchor carried by said frame, a rack arranged longitudinally of the anchor and a rotative pinion mounted in the frame and meshing with said rack, said anchor being swingable about the axis of said pinion as a fulcrum whereby when the anchor is withdrawn from the ground, the overweight of the upper end thereof swings the lower end of the anchor away from the ground.

7. In a capstan, a frame, provided at its rear end with a shaft, a drum on the shaft, an anchor having guiding connections with said frame, means whereby the anchor may be forced into the ground and tension connections extending directly between said shaft and the anchor near the ground level thereof.

8. The combination with a capstan, embracing a rigid frame provided at its rear end with a shaft and a drum on the shaft, of an anchor therefor insertible into and withdrawable from the ground, and tension connections extending directly from the anchor near the ground level thereof to the frame at a point near the drum.

9. In a capstan, a frame, provided at its rear end with a shaft, a drum on the shaft, an anchor having guiding connections with said frame, means whereby the anchor may be forced into the ground and tension connections extending between said shaft and the anchor near the ground level thereof, said tension connections embracing means to permit it to break out of tension line when the rear end of the anchor is swung upwardly.

10. In a capstan, a frame provided at its rear end with a shaft, a drum on the shaft, a longitudinally slidable, rearwardly inclined anchor, guide bearings carried by the frame for the anchor, a lower guide bearing near the ground level depending from and carried by the frame, and a tension device extending between said lower guide and said drum axle or shaft.

11. In a capstan, a frame provided at its rear end with a shaft, a drum on the shaft, a longitudinally slidable, rearwardly inclined anchor, guide bearings carried by the frame for the anchor, a lower guide bearing near the ground level depending from and carried by the frame, said latter guide comprising a shaft extending transversely in front of the anchor, plates arranged laterally at the sides of said anchor through which said shaft extends, bearing rollers carried by the plates for engagement with the rear side of said anchor, and tension means connecting said latter shaft to the drum shaft or axle.

12. In a capstan, a frame provided at its rear end with a shaft or axle, a drum thereon, a longitudinally slidable, rearwardly inclined anchor, guides carried by the frame for said anchor, a shaft extending transversely across the frame between said drum shaft or axle and the anchor, spacing links connecting said latter shaft to the drum shaft or axle, and other links connected to the anchor guide near the ground level and having slotted connection with said intermediate shaft.

13. A self-propelled motor driven capstan comprising a frame provided with a driving and a steering axle, traction and steering wheels on the driving and steering axles, respectively, a motor carried by the frame, a drum rotatively mounted on the driving axle, gearing operatively connecting the motor to the drum and to the driving axle to independently drive the same, an inclined anchor in advance of the drum, guides for the upper and lower ends of the anchor carried by the frame, operative connections between the motor and anchor, independent of the drum and axle driving connections, to force the anchor into and withdraw the same from the ground and connections between the driving axle and the lower end of the anchor.

14. A self-propelled motor driven capstan comprising a frame provided with a driving and a steering axle, traction and steering wheels on the driving and steering axles, respectively, a motor carried by the frame, a drum rotatively mounted on the driving axle, gearing operatively connecting the motor to the drum and to the driving axle to independently drive the same, an anchor in advance of the drum, guides for the anchor carried by the frame, operative connections between the motor and anchor, independent of the drum and axle driving connections, to force the anchor into and withdraw the same from the ground, and tension means extending directly from the driving axle to the anchor guide at a point near the ground level.

15. In a capstan, a frame, provided at its rear end with a shaft, a drum on the shaft, an anchor having guiding connections with said frame, means whereby the anchor may be forced into the ground, tension connections extending between said shaft and the anchor near the ground level thereof and means for varying the angle of presentation of the anchor to the ground.

16. In a capstan, a frame provided at its rear end with a shaft or axle, a drum thereon, a longitudinally slidable, rearwardly inclined anchor, guides carried by the frame for said anchor, a shaft extending transversely across the frame between said drum shaft or axle and the anchor, spacing links connecting said latter shaft to the drum shaft or axle, and other links connected to the anchor guide near the ground level and having slotted connection with said intermediate shaft, said latter links having adjustable connection to said lower anchor guide.

17. In a capstan, a frame provided at its rear end with an axle or shaft, a drum thereon, a longitudinally slidable, rearwardly inclined anchor, upper and lower guides for the anchor carried by the frame, a tension link having means adjustably connecting it to the lower anchor guide and means for connecting the tension link to the frame adjacent to the drum axle.

In testimony, that I claim the foregoing as my invention I affix my signature in the presence of two witnesses, this 13th day of September, A. D. 1912.

CHARLES H. CLARK.

Witnesses:
A. B. CLARK,
W. L. HALL.